United States Patent
Sui et al.

(10) Patent No.: US 11,650,593 B2
(45) Date of Patent: May 16, 2023

(54) MOVING METHOD FOR SELF-MOVING DEVICE AND SELF-MOVING DEVICE

(71) Applicant: SHENZHEN SILVER STAR INTELLIGENT GROUP CO., LTD., Shenzhen (CN)

(72) Inventors: Linghui Sui, Shenzhen (CN); Lize Lin, Shenzhen (CN); Peng Liu, Shenzhen (CN)

(73) Assignee: SHENZHEN SILVER STAR INTELLIGENT GROUP CO., LTD., Shenzhen (CN)

( * ) Notice: Subject to any disclaimer, the term of this patent is extended or adjusted under 35 U.S.C. 154(b) by 374 days.

(21) Appl. No.: 16/668,819

(22) Filed: Oct. 30, 2019

(65) Prior Publication Data
US 2020/0401153 A1    Dec. 24, 2020

(30) Foreign Application Priority Data

Jun. 20, 2019  (CN) .......................... 201910539376.2

(51) Int. Cl.
*G05D 1/02* (2020.01)
*G05D 1/00* (2006.01)

(52) U.S. Cl.
CPC ......... *G05D 1/0223* (2013.01); *G05D 1/0088* (2013.01); *G05D 2201/0215* (2013.01)

(58) Field of Classification Search
CPC ............... G05D 1/0223; G05D 1/0088; G05D 2201/0215; B60W 2300/00;
(Continued)

(56) References Cited

U.S. PATENT DOCUMENTS

2004/0111184 A1* 6/2004 Chiappetta ............... G01S 5/16
701/23
2011/0153081 A1* 6/2011 Romanov ............... B60L 15/20
901/30
(Continued)

FOREIGN PATENT DOCUMENTS

CN    107092260 A  *  8/2017  ............. G05D 1/024
CN    107092260 A     8/2017
(Continued)

OTHER PUBLICATIONS

Machine Translation of Description of CN 107092260 A, Aug. 2017, pp. 1-15 (Year: 2022).*
(Continued)

*Primary Examiner* — Anne Marie Antonucci
*Assistant Examiner* — Jared C Bean
(74) *Attorney, Agent, or Firm* — Gang Yu (57) ABSTRACT

A moving method for a self-moving device, and a self-moving device are provided. The method includes: driving the self-moving device to move in a first advancing direction; determining whether the self-moving device can continue to move in the first advancing direction; and controlling the self-moving device to perform a first escape preprocessing operation, if the self-moving device cannot continue to move in the first advancing direction. When the self-moving device is encountered with a raised sill on the ground, the solution provided in the present disclosure enables the self-moving device to effectively cross the raised sill.

20 Claims, 4 Drawing Sheets

(58) Field of Classification Search
CPC ..... B60W 2530/213; B60W 2540/041; B60W 2540/049; B60W 2552/00; B60W 2556/65; B60W 2710/00; B60W 2720/406; B60W 2754/00; B60W 2900/00

See application file for complete search history.

(56) References Cited

U.S. PATENT DOCUMENTS

2016/0103451 A1* 4/2016 Vicenti ................ G05D 1/0242
 700/259
2018/0289225 A1* 10/2018 Izawa .................. G05D 1/0255

FOREIGN PATENT DOCUMENTS

| | | |
|---|---|---|
| CN | 109394086 A | 3/2019 |
| CN | 109426264 A | 3/2019 |
| CN | 109906134 A | 6/2019 |

OTHER PUBLICATIONS

First Office Action dated Nov. 25, 2020, issued in Chinese Application No. 201910539376.2.
Second Office Action dated Apr. 27, 2021, issued in Chinese Application No. 201910539376.2.
Third Office Action dated Nov. 2, 2021, issued in Chinese Application No. 201910539376.2.
First Search Report dated Nov. 18, 2020, issued in Chinese Application No. 201910539376.2.

* cited by examiner

MOVING METHOD FOR SELF-MOVING DEVICE AND SELF-MOVING DEVICE

CROSS-REFERENCE TO RELATED APPLICATIONS

The present disclosure claims the priority of Chinese Patent Application No. 201910539376.2, filed with the Chinese Patent Office on Jun. 20, 2019 and entitled "Moving Method for Self-moving Device and Self-moving Device", which is incorporated herein by reference in its entirety.

TECHNICAL FIELD

The present disclosure relates to the field of intelligent equipment, and particularly to a moving method for a self-moving device, and a self-moving device.

BACKGROUND ART

With the continuous development of computer technology and artificial intelligence technology, self-moving robots like intelligent devices have begun to slowly move into people's lives. Companies such as iRobot, Samsung, Ecovacs, and Xiaomi have all developed fully automatic dust collectors which are already put on the market. This kind of fully automatic dust collectors are generally small in size and integrated with an environment sensor, a self-driving system, a dust suction system, a battery and a charging system, and can automatically cruise and collect dust in a working area, and automatically return to a charging station to be plugged and charged when the energy thereof is low, and then continue to cruise and collect dust, without manual manipulation.

However, at present, when a self-moving device (such as a cleaning robot) encounters a door sill or other object that protrudes from the ground, if the body thereof contacts the object or a wheel is blocked by an obstacle, the self-moving device will retreat directly to avoid the object without performing an operation of getting over the obstacle. As a result, when the robot needs to enter and work in other areas separated by an obstacle, it is necessary to manually pick up and hold the robot and place the robot in the corresponding area, which may lead to poor user experience.

SUMMARY

The technical problem to be solved by the present disclosure is to provide a moving method for a self-moving device, and a self-moving device, to solve the problem that when the body of the self-moving device contacts an object or when a wheel of the self-moving device is blocked by an obstacle, the self-moving device does not perform an effective operation of crossing the obstacle, but requires manual assistance to cross the obstacle, thereby improving the user's use experience.

In order to solve the above-mentioned technical problem, the embodiments of the present disclosure employ the following technical solutions:

The present disclosure provides a moving method for a self-moving device, comprising steps of:

driving the self-moving device to move in a first advancing direction; determining whether the self-moving device can continue to move in the first advancing direction; and controlling the self-moving device to perform a first escape preprocessing operation, if the self-moving device cannot continue to move in the first advancing direction.

Optionally, the first escape preprocessing operation comprises: driving the self-moving device to move in a second advancing direction, wherein the second advancing direction is a direction deviated from the first advancing direction towards a first side direction by a first preset angle.

Optionally, whether the self-moving device can continue to move in the second advancing direction is determined; wherein the self-moving device is controlled to perform a second escape preprocessing operation, if the self-moving device cannot continue to move in the second advancing direction.

Optionally, the second escape preprocessing operation comprises at least one of the following operations:

driving the self-moving device to move in a third advancing direction; controlling the self-moving device to move back; increasing the rotation speed of a driving motor of the self-moving device; and recording the current position of the self-moving device; and controlling the self-moving device to bypass the recorded current position of the self-moving device according to a preset motion type; controlling the self-moving device to send an alarm prompt; and increasing the reverse-rotation speed of a driving wheel of the self-moving device.

Optionally, the first escape preprocessing operation further comprises: driving the self-moving device to move in the third advancing direction, wherein the third advancing direction is a direction deviated from the first advancing direction towards a second side direction by the first preset angle.

Optionally, the first preset angle ranges from 3° to 45°.

Optionally, the first escape preprocessing operation comprises: controlling the self-moving device to move back; and/or increasing the rotation speed of a motor of the driving wheel of the self-moving device.

Optionally, the first escape preprocessing operation comprises at least one of the following operations: marking the current position of the self-moving device; controlling the self-moving device to move back; and determining whether the self-moving device can move back;

controlling the self-moving device to bypass the marked current position according to the preset motion type, if the self-moving device can move back successfully; controlling the self-moving device to perform a third escape preprocessing operation, if the self-moving device cannot move back successfully; controlling the self-moving device to send alarm information; and increasing the reverse-rotation speed of the driving wheel of the self-moving device.

Optionally, the marking the current position of the self-moving device specifically comprises: marking the current position of the self-moving device as an "obstacle"; marking information on the "obstacle" on a map constructed by the self-moving device; and controlling the self-moving device to no longer pass the marked position in the subsequent operation.

Optionally, the self-moving device is one of a cleaning robot, a service robot, a business robot and a transfer robot.

The present disclosure further provides a self-moving device, comprising a traveling mechanism configured to drive the self-moving device to move on a working surface; a controller configured to generate various control instructions; and a processor configured to process a plurality of control instructions, wherein the control instructions are configured to be loaded and executed by the processor: driving the self-moving device to move in a first advancing direction; determining whether the self-moving device can continue to move in the first advancing direction; and controlling the self-moving device to perform a first escape preprocessing operation, if the self-moving device cannot continue to move in the first advancing direction.

Optionally, the first escape preprocessing operation comprises: driving the self-moving device to move in a second advancing direction, wherein the second advancing direction is a direction deviated from the first advancing direction towards a first side direction by a first preset angle; and the processor further loads and executes the following instructions: determining whether the self-moving device can continue to move in the second advancing direction; and controlling the self-moving device to perform a second escape preprocessing operation, if the self-moving device cannot continue to move in the second advancing direction.

BRIEF DESCRIPTION OF DRAWINGS

In order to more clearly illustrate the technical solutions of the embodiments of the present disclosure or in the prior art, brief description to be made below on the drawings required to be used in the description of the embodiments or the prior art. Apparently, the following drawings only illustrate some of the embodiments of the present disclosure, and for a person of ordinary skills in the art, other variants may be obtained from these drawings without inventive effort.

wherein the above-mentioned drawings include the following reference signs.

1. self-moving device;
1A. traveling mechanism;
1B. driving motor;
1C. driving wheel;
2. raised sill;
3. raised tip;
4. controller;
5. memory;
6. executor; and
7. communication module.

DETAILED DESCRIPTION OF EMBODIMENTS

The technical solutions in the embodiments of the present disclosure will be clearly described below with reference to the drawings of the embodiments of the present disclosure. Apparently, the embodiments described are only some of the embodiments of the present disclosure, rather than all of the embodiments of the present disclosure. All the other embodiments that are obtained by a person of ordinary skills in the art on the basis of the embodiments of the present disclosure without inventive effort shall be covered by the scope of protection of the present disclosure.

The self-moving device 1 mentioned in the present disclosure includes, but is not limited to, cleaning robot, service robot, business robot and transfer robot.

Embodiment 1

As shown in FIG. 1 to FIG. 6, a self-moving device 1 encounters a raised sill 2 while moving in a working space, the self-moving device 1 moves in a first advancing direction A under the control of its own controller 4, by performing a crossing (surmount) action tentatively, i.e. continuing to control the self-moving device 1 to advance, and by determining whether the self-moving device 1 can continuously have a new position in the first advancing direction A or whether the self-moving device 1 can maintain a continuous change in position in the first advancing direction A, whether the self-moving device 1 can cross the raised sill 2 is determined; if the self-moving device 1 cannot continue to move in the first advancing direction A, i.e. the self-moving device 1 cannot cross the raised sill 2, a control system of the self-moving device 1 controls the self-moving device 1 to perform a first escape preprocessing operation, such that the self-moving device 1 can cross the raised sill 2 more easily to enter and operate in the separated working area on the other side of the raised sill 2.

Figure 5:
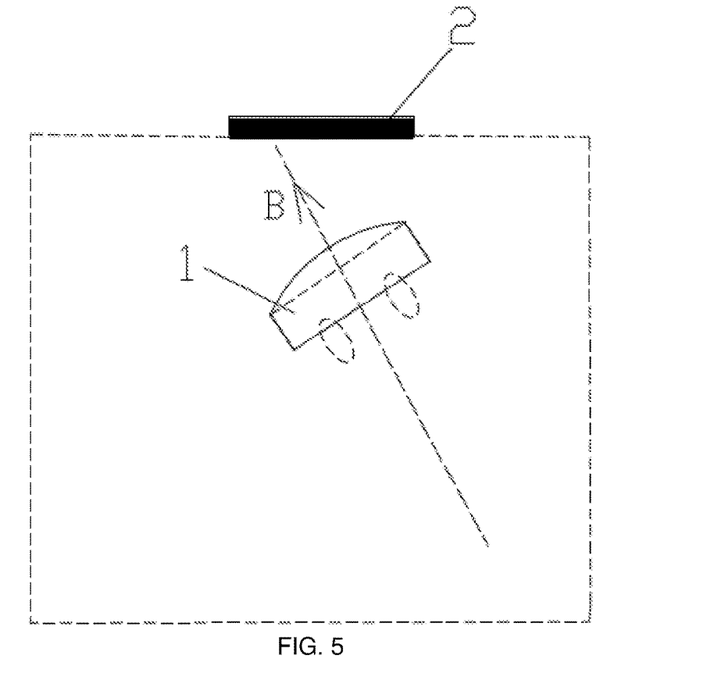
FIG. 5 is a structural schematic diagram showing the self-moving device moving in a second advancing direction according to an embodiment of the present disclosure.

The first escape preprocessing operation comprises, but is not limited to, changing the moving direction of the self-moving device 1. Specifically, the first escape preprocessing operation comprises, but is not limited to, driving the self-moving device 1 to move in a second advancing direction B, wherein the second advancing direction B is a direction deviated from the first advancing direction A towards a first side direction by a first preset angle. In a specific implementation process, the first side direction may be the leftward direction or the rightward direction, which may be selected specifically in design according to the performance of a product; and the first preset angle may also be set according to the specific performance of the product. It is found in experiments that a good driving effect can always be achieved when the first preset angle is in the range of 3-45°.

Figure 6:
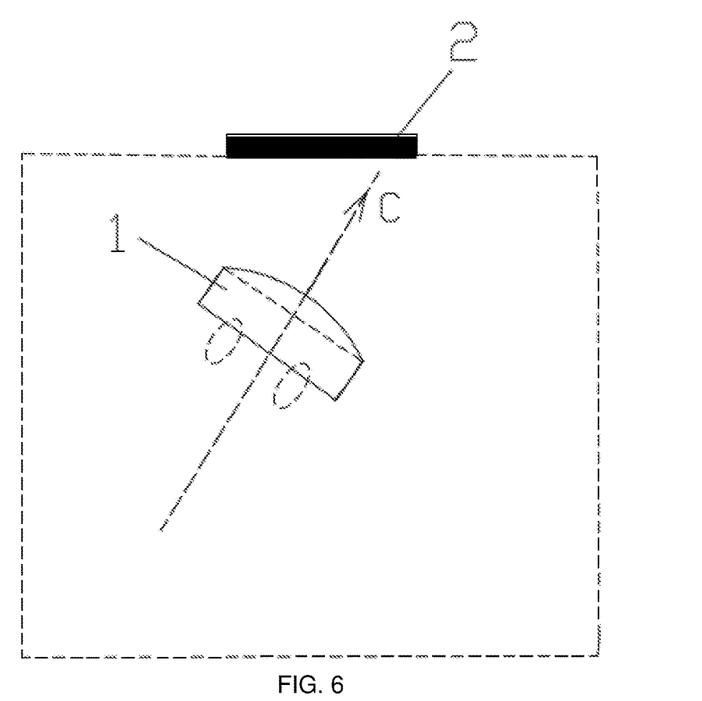
FIG. 6 is a structural schematic diagram showing the self-moving device moving in a third advancing direction according to an embodiment of the present disclosure.

In addition, the changing the moving direction of the self-moving device 1 in the first escape preprocessing operation may also be achieved by driving the self-moving device 1 to move in a third advancing direction C, wherein the third advancing direction C is a direction deviated from the first advancing direction A towards a second side direction by the first preset angle. In the specific implementation process, the second side direction may be the leftward direction or the rightward direction (if the first side direction is the leftward direction, the second side direction is the rightward direction, and if the first side direction is the rightward direction, the second side direction is the leftward direction), which may be selected specifically in design according to the performance of the product; and the first preset angle may also be set according to the specific performance of the product. It is found in experiments that a good driving effect can always be achieved when the first preset angle is in the range of 3-45°. Moreover, in order to make the sill crossing performance of the self-moving device 1 more prominent such that the self-moving device 1 can cross the raised sill 2 more easily, it is feasible to control the rotation speed of the driving wheels 1C of the self-moving device 1 by increasing the current of the driving wheels 1C of the self-moving device 1 or increasing the voltage duty ratio of the driving wheels 1C by the control system, and then perform the operation of crossing the raised sill 2, or it is feasible to control the self-moving device 1 to move back first and then perform the operation of crossing the raised sill 2; and it is also feasible to combine the above two crossing strategies, i.e., first controlling the self-moving device 1 to move back, then increasing the rotation speed of the driving wheels 1C, and finally performing the operation of crossing the raised sill 2. The reason is that both the practice of driving the self-moving device 1 to move back and then driving the self-moving device 1 to move forward to cross the raised sill 2 and the practice of increasing the rotation speed of the driving wheels 1C of the self-moving device 1 first and then crossing the raised sill 2 can increase the kinetic energy and motion inertia of the self-moving device 1, such that the self-moving device 1 can cross the raised sill 2 more easily.

At this time, whether the self-moving device 1 can continue to move in a changed direction after changing its moving direction is determined. Whether the moving direction of the self-moving device 1 is changed to the second advancing direction B or the third advancing direction C, a second escape preprocessing operation always needs to be performed. In the present disclosure, the case where the moving direction of the self-moving device 1 is changed to the second advancing direction B is taken as an example, and as to the case where the moving direction of the self-moving device 1 is changed to the third advancing direction C, the second escape preprocessing operation can be performed following a similar thought.

When the self-moving device 1 changes its moving direction and moves in the second advancing direction B, whether the self-moving device 1 can continue to move in the second advancing direction B is determined, so as to determine whether the self-moving device 1 can cross the raised sill 2 successfully after the first escape preprocessing operation. If the self-moving device 1 still cannot cross the raised sill 2 after the first escape preprocessing operation, that is, the self-moving device 1 cannot continue to move in the second advancing direction B, then the self-moving device 1 is controlled to perform the second escape preprocessing operation, which causes the self-moving device 1 to try to cross the raised sill 2 again, so as to make it more possible for the self-moving device 1 to cross the raised sill 2 or further optimize the position information of the raised sill 2 to establish a large database for training learning of the self-moving device 1. The second escape preprocessing operation may be one or a combination of two or more of the following processing operations:

changing the moving direction of the self-moving device 1;

controlling the self-moving device 1 to move back;

increasing the rotation speed of the driving motor 1B of the self-moving device 1;

recording the current position of the self-moving device 1;

controlling the self-moving device 1 to bypass the recorded current position of the self-moving device 1 according to a preset motion type;

controlling the self-moving device 1 to send an alarm prompt; and increasing the reverse-rotation speed of the driving wheels 1C of the self-moving device 1.

Changing the moving direction of the self-moving device 1: the self-moving device 1 is driven to move in the third advancing direction C, here, when the self-moving device 1 moves in the third advancing direction C, the angle by which the self-moving device 1 is rotated is twice the angle by which the self-moving device 1 is rotated when the direction thereof is changed from the first advancing direction A to the second advancing direction B, and the former rotation is opposite to the latter rotation in direction. Changing the moving direction of the self-moving device 1 may achieve crossing of the raised sill 2 in cases of different advancing directions of the self-moving device 1, and increase the likelihood of crossing the raised sill 2, and after the moving direction of the self-moving device 1 is changed, it is easy for the self-moving device 1 to selectively keep away from the raised sill 2.

Controlling the self-moving device 1 to move back: when the self-moving device 1 cannot continue to move in the second advancing direction B, the self-moving device 1 may be controlled to move back, in this way, it is possible to reserve sufficient space for the self-moving device 1's subsequent action of crossing the raised sill 2, and sufficient space is reserved for the self-moving device 1 to cross the raised sill 2 again in a later stage, for changing the rotation speed of the driving wheels 1C of the self-moving device 1, or for controlling the self-moving device 1 to move away from the raised sill 2, which facilitates the self-moving device 1 to perform subsequent related actions on the raised sill 2.

Increasing the rotation speed of the driving motor 1B of the self-moving device 1: when the self-moving device 1 cannot continue to move in the second advancing direction B, increasing the rotation speed of the driving motor 1B of the self-moving device 1 can increase the driving force of the driving wheels 1C to increase the moving speed of the driving wheels 1C, thereby making it more possible for the self-moving device 1 to cross the raised sill 2.

Recording the current position of the self-moving device 1: when the self-moving device 1 cannot successfully cross the raised sill 2, by recording the current position of the self-moving device 1, the position of the raised sill 2 is indirectly determined, that is, the position of the self-moving device 1 at this time is also the position of the raised sill 2, then the self-moving device 1 can record the position of the raised sill 2 and inform the controller 4 of the self-moving device 1 of the presence of the raised sill 2 at this position or incorporate the information of the raised sill 2 into a map constructed by the self-moving device 1 so that the map constructed by the self-moving device 1 becomes more complete.

Controlling the self-moving device 1 to bypass the recorded current position of the self-moving device 1 according to a preset motion type: in the case where the self-moving device 1 cannot cross the raised sill 2, the current position of the self-moving device 1 is recorded, the self-moving device 1 needs to avoid the raised sill 2 by itself to timely bypass the raised sill 2, the motion type here may be one or a combination of the followings, but is not limited to the following motion types, for example: moving away from the raised sill 2 in the direction opposite to the direction upon colliding with the raised sill 2, moving around the raised sill 2 in the form of polyline movement until the raised sill 2 is bypassed, and it is also feasible to avoid the raised sill 2 by moving in an arc manner, i.e., gradually bypassing the raised sill 2 in the form of an arc transition, the arc here may have be an arc having a gradually increased radius to facilitate bypassing the raised sill 2.

Controlling the self-moving device 1 to send an alarm prompt: the user is informed by the self-moving device 1 by sending of an alarm prompt, for example, by giving a voice alarm, or the self-moving device 1 may communicate with a mobile terminal to send the information to the mobile terminal, and the user can be informed of the alarm information from the self-moving device 1 via the mobile terminal; and the user can operate the self-moving device 1, e.g., assisting the self-moving device 1 to cross the raised sill 2, etc., according to the information of the alarm.

Increasing the reverse-rotation speed of the driving wheels 1C of the self-moving device 1: increasing the reverse-rotation speed of the driving wheels 1C of the self-moving device 1 may cause the self-moving device 1 to quickly move away from the raised sill 2, or it is also feasible to cause one set of wheels of the self-moving device 1 to first cross the raised sill 2 by using the relation between the front and rear wheels among the driving wheels 1C of the self-moving device 1, e.g., the front wheel(s) rotating forward and the rear wheel(s) rotating reversely, and then drive the rear wheel(s) to rotate forward to make the rear wheel(s) cross the raised sill 2 as well, an alternative implementation process may be increasing the climbing ability of the self-moving device 1 by controlling the rear wheel(s) to rotate forward, and the front wheel(s) to rotate reversely or stop rotating; and these implementation processes are all beneficial to the self-moving device 1 in crossing the raised sill 2.

In order to enable the self-moving device 1 to more efficiently cross the raised sill 2, the first escape preprocessing operation performed by the self-moving device 1 may also be at least one of the followings:

marking the current position of the self-moving device 1;

controlling the self-moving device 1 to move back;

determining whether the self-moving device 1 can move back;

controlling the self-moving device 1 to bypass the marked current position according to the preset motion type, if the self-moving device 1 can move back successfully;

controlling the self-moving device 1 to perform a third escape preprocessing operation, if the self-moving device 1 cannot move back successfully;

controlling the self-moving device 1 to send alarm information; and increasing the reverse-rotation speed of the driving wheels 1C of the self-moving device 1.

In the above, marking the current position of the self-moving device 1: when the self-moving device 1 cannot successfully cross the raised sill 2, by marking the current position of the self-moving device 1, the position of the raised sill 2 is indirectly determined, that is, the position of the self-moving device 1 at this time is also the position of the raised sill 2, the self-moving device 1 can record the position of the raised sill 2 and inform the controller 4 of the self-moving device 1 of the presence of the raised sill 2 at this position or incorporate the information of the raised sill 2 into a map constructed by the self-moving device 1 so that the map constructed by the self-moving device 1 becomes more complete. Specifically, in practice, it is feasible to mark the marked current position of the self-moving device 1 as an "obstacle", and incorporate the information on the "obstacle" into the motion map constructed by the self-moving device 1 to complete a space map, so that when the self-moving device 1 is encountered with the information on the "obstacle" that cannot be crossed by itself in a later stage, the self-moving device 1 will not pass the marked "obstacle" position, thereby saving the operation time and reducing energy consumption of the self-moving device 1 and improving the working efficiency of the self-moving device 1.

Controlling the self-moving device 1 to move back: when the self-moving device 1 cannot continue to move in the first advancing direction A, the self-moving device 1 may be controlled to move back, in this way, it is possible to reserve sufficient space for the self-moving device 1's subsequent action of crossing the raised sill 2, and sufficient space is reserved for the self-moving device 1 to cross the raised sill 2 again in a later stage, for changing the rotation speed of the driving wheels 1C of the self-moving device 1, or for controlling the self-moving device 1 to keep away from the raised sill 2, which facilitates the self-moving device 1 to perform subsequent related actions on the raised sill 2.

Determining whether the self-moving device 1 can move back: a degree of trap of the self-moving device 1 is acquired by determining whether the self-moving device 1 can move back, if the self-moving device 1 can move back, it indicates that the self-moving device 1 is not completely trapped, and if the self-moving device 1 cannot move back, it indicates that the self-moving device 1 is completely trapped, and in this way, it is possible to determine the degree of trap of the self-moving device 1, so as to make facilitate the self-moving device 1 to take escape measures according to different degrees of the trap; at this time, if the self-moving device 1 can move back successfully, it can be known that the self-moving device 1 is not currently restricted completely, then the self-moving device 1 is controlled to bypass the marked current position according to a preset motion type, the motion type here may be one or a combination of the followings, but is not limited to the following motion types, for example: moving away from the raised sill 2 in the direction opposite to the direction upon colliding with the raised sill 2, moving around the raised sill 2 in the form of polyline movement to bypass the raised sill 2, and it is also feasible to avoid the raised sill 2 by moving in an arc manner, i.e., gradually bypassing the raised sill 2 in the form of an arc transition, the arc here may be an arc having a gradually increased radius to facilitate bypassing the raised sill 2; however, if the self-moving device 1 cannot move back successfully, the self-moving device 1 is controlled to perform the third escape preprocessing operation.

Figure 1:
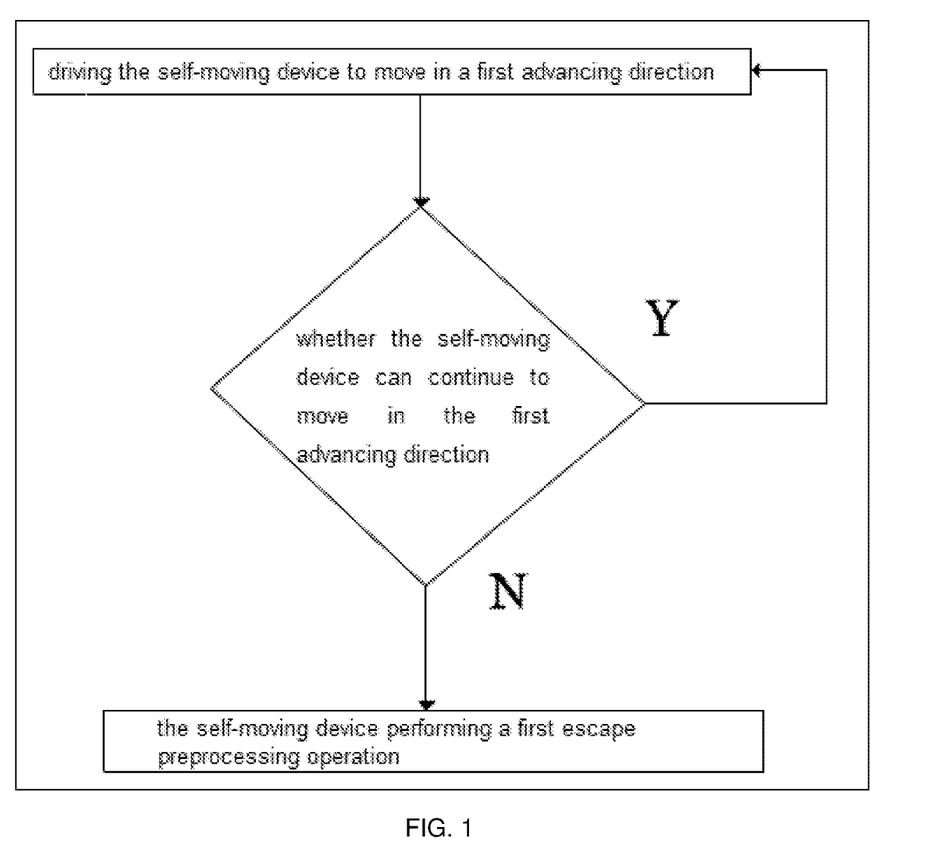
FIG. 1 is a schematic diagram of a moving method for a self-moving device according to an embodiment of the present disclosure.
Figure 2:
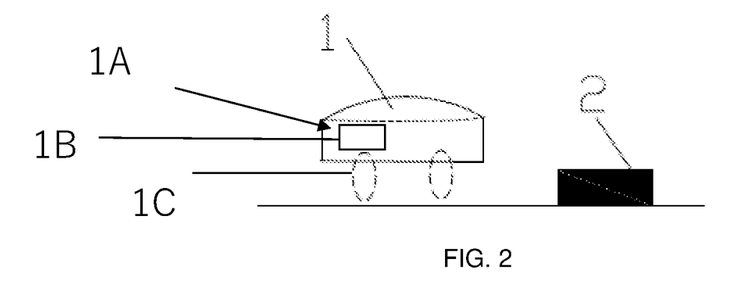
FIG. 2 is a structural schematic diagram of a self-moving device and a raised sill according to an embodiment of the present disclosure.
Figure 3:
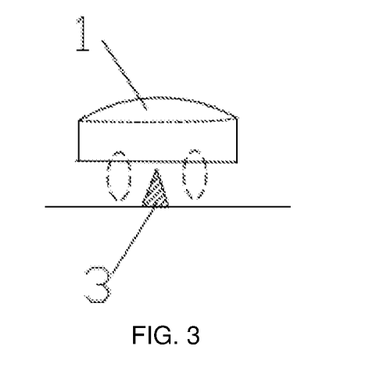
FIG. 3 is a structural schematic diagram of the self-moving device and a raised tip according to an embodiment of the present disclosure.
Figure 4:
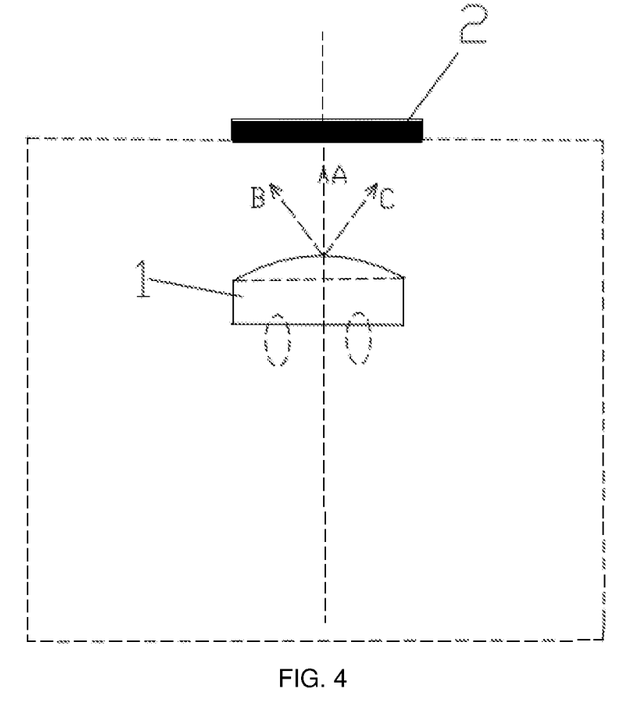
FIG. 4 is a structural schematic diagram showing the self-moving device moving in a first advancing direction according to an embodiment of the present disclosure.

If the self-moving device 1 cannot move back successfully, it means that the self-moving device 1 has been trapped, e.g., it may be stuck by the raised tip 3, as shown in FIG. 3, then the third escape preprocessing operation is required to be performed, and the third escape preprocessing operation is at least one of the followings:

changing the moving direction of the self-moving device 1;

controlling the self-moving device 1 to move back;

increasing the rotation speed of the driving motor 1B of the self-moving device 1;

recording the current position of the self-moving device 1;

controlling the self-moving device 1 to send an alarm prompt;

increasing the reverse-rotation speed of the driving wheels 1C of the self-moving device 1; and marking the current position of the self-moving device 1 as a "trap", incorporating the "trap" into a map constructed by the self-moving device 1, and controlling the self-moving device 1 to no longer pass the "trap" position in the subsequent operation.

In the above, changing the moving direction of the self-moving device 1: by changing the moving direction of the self-moving device 1, it is possible to enable the self-moving device 1 to perform the subsequent operations after changing to a different angle, e.g., controlling the self-moving device 1 to first rotate by a certain angle and then controlling the self-moving device 1 to move back, or controlling the self-moving device 1 to move back, while controlling the self-moving device 1 to rotate, such that the self-moving device 1 gains an increased laterally deflected torque while moving back, which is more beneficial to for the self-moving device 1 to achieve a successful moving back.

Controlling the self-moving device 1 to move back: performing moving back of the self-moving device 1 is attempted multiple times to increase the likelihood of successful moving back of the self-moving device 1.

Increasing the rotation speed of the driving motor 1B of the self-moving device 1: here, by increasing the rotation speed of the driving motor 1B of the self-moving device 1, it is possible to increase the power of the movement of the self-moving device 1, so as to make it easier for the self-moving device 1 to escape from the trapped situation.

Controlling the self-moving device 1 to send an alarm prompt: the user can easily be informed of the current trapped state of the self-moving device 1 by the alarm information from the self-moving device 1, which can also speed up escape of the self-moving device 1.

Increasing the reverse-rotation speed of the driving wheels 1C of the self-moving device 1: this measure can increase the driving force of moving back provided by the driving wheels 1C of the self-moving device 1 by increasing the reverse-rotation speed of the driving motor 1B of the self-moving device 1, so as to increase the power for escape of the self-moving device 1.

Marking the current position of the self-moving device 1 as a "trap": the case where the self-moving device 1 cannot move back indicates that the self-moving device 1 is stuck at this time, e.g., being hold or stuck by a sharp object 3 on the ground and unable to advance or move back, as shown in FIG. 5, in this case, if the self-moving device 1 passes this position again, and is stuck again and cannot escape, then it is feasible to mark the position of the self-moving device 1 at this time as a "trap", incorporate the "trap" into a map constructed by the self-moving device 1, and control the self-moving device 1 to no longer pass the "trap" position in the subsequent operation, thereby avoiding the case where the self-moving device 1 is stuck again and cannot escape.

With the moving method for a self-moving device 1 disclosed in this embodiment, when a door sill or raised sill 2 on the ground is encountered, a crossing action can be effectively performed on the door sill or the raised sill 2, without any need to manual assist in lifting the self-moving device 1, which improves the working performance of the self-moving device 1 and improves the obstacle crossing capacity of the self-moving device 1. Moreover, with the moving method for a self-moving device 1 disclosed in the present disclosure, a self-actuated escape of the self-moving device 1 can be realized in the case where the self-moving device 1 encounters and get stuck by a sharp object, such as a raised tip 3, on the ground, alarm information is sent at an appropriate time, and at the same time the information on the trap is marked up on the map to improve the map function, which facilitates the user's operation and improves the product experience. In particular, applying the moving method for a self-moving device 1 to a cleaning robot may enable the cleaning robot to cross a door sill to enter the a room separated by the door sill to perform cleaning tasks, thereby increasing the working efficiency of the cleaning robot.

Effects: when the above-described moving method for a self-moving device 1 is used to drive a self-moving device 1, whether it is a cleaning robot, a service robot, a business robot or a transfer robot, when encountered with a door sill or a barrier structure protruding from the ground, the self-moving device 1 can perform effective crossing without the need for the user to manually move the self-moving device 1, thereby improving the user experience of the product.

Embodiment 2

Figure 7:
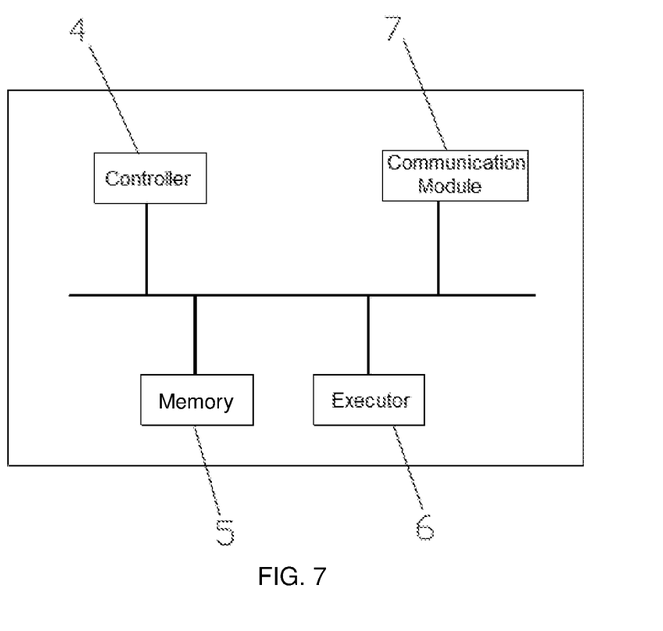
FIG. 7 is a structural schematic diagram of the self-moving device according to another embodiment of the present disclosure.

Another embodiment of the present disclosure provides a self-moving device 1. The self-moving device 1 comprises a traveling mechanism 1A which drives the self-moving device 1 to walk on a working surface to assist in realizing the relevant functions of the self-moving device 1. The traveling mechanism 1A may be a driving wheel assembly, a crawler wheel assembly, or an assembly in other form that can realize moving of the self-moving device 1. The traveling mechanism 1A may include a driving motor 1B and driving wheels 1C. The self-moving device 1 in this embodiment further comprises a controller 4, a memory 5, an executor 6 and a communication module 7, and these modules are connected with each other by a bus, as shown in FIG. 7, in which:

The controller 4 is an electronic computing core built in the main body of the self-moving device 1 and is configured to perform logical operation steps to realize intelligent control of the self-moving device 1. In the present embodiment, the controller 4 is connected with the executor 6 and is configured to perform, according to an instruction output from the controller 4, a preset algorithm for map construction and controlling the traveling mechanism 1A of the self-moving device 1 according to the constructed map to cause the robot to perform corresponding movement according to the instruction.

The communication connection between any two of the controller 4, the memory 5, the executor 6 and the communication module 7 is established by the bus. The controller 4 is configured to generate a control instruction. The memory 5 is configured to store the control instruction and transmit the control instruction to the executor 6 via the communication module 7 to cause the executor to execute the corresponding instruction. In addition, by the executor 6 executing the corresponding control instruction, a corresponding electric signal is generated, and the movement of the traveling mechanism 1A is further controlled by the generated electric signal, so as to realize the traveling function of the self-moving device 1.

The executor 6 may be any type of single-threaded or multi-threaded processor. The executor 6 may have one or more processing cores and is configured to acquire data, perform logical operation functions, and send operation processing results, etc.

The memory 5 is a non-volatile computer readable storage medium, e.g., at least one of a disk storage device, a flash memory device, a distributed storage device remotely disposed with respect to the executor 6, other non-volatile solid-state storage devices, etc. The memory 5 has a program storage area for storing non-volatile software programs, non-volatile computer executable programs, and functional modules.

These computer executable programs and functional modules are available to be invoked by the executor 6 to cause the executor 6 to perform one or more method steps. The memory 5 may further have a data storage area for storing operation processing results sent and output by the executor 6.

The communication module 7 is a hardware module for establishing communication connection between the controller 4 and an external functional module. As to the communication module 7, a corresponding type of wireless or wired communication module, such as a WiFi module, a Bluetooth module or an input/output interface may be selected according to actual needs.

Based on the communication module 7, the controller 4 may collect user instructions and present a corresponding interactive interface to the user. For example, the controller 4 may establish connection with an intelligent mobile terminal of the user using the WiFi module, and collect user instructions or present to the user the current working state of the self-moving device 1 such as a cleaning robot, etc. in the manner of APP or web page.

For the self-moving device 1 in this embodiment, various control instructions are generated by the controller 4, and the related instructions are loaded and executed by the executor 6 to drive the traveling mechanism 1A of the self-moving device 1 to move, wherein the related instructions include the followings:

driving the self-moving device 1 to move in a first advancing direction A;

determining whether the self-moving device 1 can continue to move in the first advancing direction A; and controlling the self-moving device 1 to perform a first escape preprocessing operation, if the self-moving device 1 cannot continue to move in the first advancing direction A.

In order to facilitate the escape of the self-moving device 1, the instruction for the first escape preprocessing operation in this embodiment at least includes any one of the following instructions:

driving the self-moving device 1 to move in a second advancing direction B, wherein the second advancing direction B is a direction deviated from the first advancing direction A towards a first side direction by a first preset angle;

and the processor also loads and executes the following control instructions:

determining whether the self-moving device 1 can continue to move in the second advancing direction B; and controlling the self-moving device 1 to perform a second escape preprocessing operation, if the self-moving device 1 cannot continue to move in the second advancing direction B.

In the above, the second escape preprocessing operation instruction may be one or more of the following operation control instructions:

changing the moving direction of the self-moving device 1;

controlling the self-moving device 1 to move back;

increasing the rotation speed of a driving motor 1B of the self-moving device 1; recording the current position of the self-moving device 1;

controlling the self-moving device 1 to bypass the recorded current position of the self-moving device 1 according to a preset motion type;

controlling the self-moving device 1 to send an alarm prompt; and increasing the reverse-rotation speed of driving wheels 1C of the self-moving device 1.

For the self-moving device 1 disclosed in this embodiment, when a door sill or raised sill 2 on the ground is encountered, a crossing action can be effectively performed on the door sill or the raised sill 2, without any need of manual assist in lifting the self-moving device 1, which improves the working performance of the self-moving device 1 and improves the obstacle crossing capacity of the self-moving device 1. Moreover, the self-moving device 1 disclosed in the present disclosure can realize a self-actuated escape in the case where the self-moving device 1 encounters and get stuck by a sharp object on the ground, and send alarm information at an appropriate time, which facilitates the user's operation and improves the product experience. The self-moving device 1 in the present disclosure includes cleaning robot, service robot, business robot and transfer robot.

The self-moving device 1 of the present disclosure, including cleaning robot, service robot, business robot and transfer robot, can perform effective crossing when encountered with a door sill or a barrier structure protruding from the ground, and can especially solve the problem that some rooms or operation areas to be cleaned cannot be cleaned because the cleaning robot cannot reach the rooms or operation areas due to a failure in effectively performing crossing, when the cleaning robot is encountered with the situation that a room or an working area is blocked or separated by a door sill, which improves the user's use experience of the self-moving device 1 product.

In the description of this specification, the description with reference to the term "one embodiment", "some embodiments", "example", "specific example", "some examples" or the like means that a specific feature, structure, material or characteristic described in connection with the embodiment(s) or example(s) is included in at least one embodiment or example of the present disclosure. In this specification, the schematic representations of the above-mentioned terms do not necessarily refer to the same embodiments or examples. Moreover, the specific feature, structure, material or characteristic described may be combined in a suitable manner in any one or more embodiments or examples.

The above-described embodiments do not constitute a limitation on the scope of protection of the technical solutions. Any modifications, equivalent substitutions, improvements etc. within the essence and principle of the above-described embodiments shall be included in the scope of protection of the technical solutions.

The invention claimed is:

1. A moving method for a self-moving device, comprising steps of:
   driving the self-moving device to move in a first advancing direction;
   determining whether the self-moving device can continue to move in the first advancing direction; and
   controlling the self-moving device to perform a first escape preprocessing operation, when the self-moving device cannot continue to move in the first advancing direction, the first escape preprocessing operation comprising:
   controlling the self-moving device to move back and then increasing a rotation speed of a motor of a driving wheel of the self-moving device to move in a second advancing direction, wherein the second advancing direction is a direction deviated from the first advancing direction towards a first side direction by a first preset angle, wherein the first preset angle ranges from 3° to 45°.

2. The moving method for the self-moving device according to claim 1, further comprising:
   determining whether the self-moving device can continue to move in the second advancing direction; and
   controlling the self-moving device to perform a second escape preprocessing operation, when the self-moving device cannot continue to move in the second advancing direction.

3. The moving method for the self-moving device according to claim 2, wherein the second escape preprocessing operation comprises at least one of the following operations:
   driving the self-moving device to move in a third advancing direction;
   controlling the self-moving device to move back;
   increasing the rotation speed of the motor of the self-moving device;
   recording a current position of the self-moving device;
   controlling the self-moving device to bypass the recorded current position of the self-moving device according to a preset motion type;
   controlling the self-moving device to send an alarm prompt; and
   increasing a reverse-rotation speed of a driving wheel of the self-moving device.

4. The moving method for the self-moving device according to claim 1, wherein the first escape preprocessing operation further comprises:
   driving the self-moving device to move in a third advancing direction, wherein the third advancing direction is a direction deviated from the first advancing direction towards a second side direction by the first preset angle.

5. The moving method for the self-moving device according to claim 1, wherein the first escape preprocessing operation further comprises at least one of the following operations:
   marking a current position of the self-moving device;
   controlling the self-moving device to move back;
   determining whether the self-moving device can move back;
   controlling the self-moving device to bypass the marked current position according to a preset motion type, when the self-moving device can move back successfully;
   controlling the self-moving device to perform a third escape preprocessing operation, when the self-moving device cannot move back successfully;
   controlling the self-moving device to send alarm information; and
   increasing a reverse-rotation speed of a driving wheel of the self-moving device.

6. The moving method for the self-moving device according to claim 5, wherein the first escape preprocessing operation comprises:
   marking a current position of the self-moving device, wherein the marking a current position of the self-moving device comprises:
   marking the current position of the self-moving device as an obstacle;
   marking information on the obstacle on a map constructed by the self-moving device; and
   controlling the self-moving device to no longer pass the marked position in subsequent operations.

7. The moving method for the self-moving device according to claim 1, wherein the self-moving device is one of a cleaning robot, a service robot, a business robot and a transfer robot.

8. A self-moving device, comprising a traveling mechanism configured to drive the self-moving device to move on a working surface; a controller configured to generate a plurality of control instructions; and an executor configured to process the plurality of control instructions, wherein the control instructions are configured to be loaded and executed by the executor to perform the following operations:
   driving the self-moving device to move in a first advancing direction;
   determining whether the self-moving device can continue to move in the first advancing direction; and
   controlling the self-moving device to perform a first escape preprocessing operation, when the self-moving device cannot continue to move in the first advancing direction, the first escape preprocessing operation comprising:
   controlling the self-moving device to move back and then increasing a rotation speed of a motor of a driving wheel of the self-moving device to move in a second advancing direction, wherein the second advancing direction is a direction deviated from the first advancing direction towards a first side direction by a first preset angle, wherein the first preset angle ranges from 3° to 45°.

9. The self-moving device according to claim 8, wherein the processor further loads and executes the following control instructions:
   determining whether the self-moving device can continue to move in the second advancing direction; and
   controlling the self-moving device to perform a second escape preprocessing operation, when the self-moving device cannot continue to move in the second advancing direction.

10. The self-moving device according to claim 9, wherein the second escape preprocessing operation comprises at least one of the following operations:
   driving the self-moving device to move in a third advancing direction;
   controlling the self-moving device to move back;
   increasing the rotation speed of the motor of the self-moving device;
   recording a current position of the self-moving device;
   controlling the self-moving device to bypass the recorded current position of the self-moving device according to a preset motion type;
   controlling the self-moving device to send an alarm prompt; and
   increasing a reverse-rotation speed of a driving wheel of the self-moving device.

11. The self-moving device according to claim 9, wherein the first escape preprocessing operation further comprises:
   driving the self-moving device to move in the third advancing direction, wherein the third advancing direction is a direction deviated from the first advancing direction towards a second side direction by the first preset angle.

12. The self-moving device according to claim 8, wherein the first escape preprocessing operation further comprises at least one of the following operations:
   marking a current position of the self-moving device;
   controlling the self-moving device to move back;
   determining whether the self-moving device can move back;
   controlling the self-moving device to bypass the marked current position according to a preset motion type, when the self-moving device can move back successfully;
   controlling the self-moving device to perform a third escape preprocessing operation, when the self-moving device cannot move back successfully;
   controlling the self-moving device to send alarm information; and
   increasing a reverse-rotation speed of the driving wheel of the self-moving device.

13. The self-moving device according to claim 12, wherein the first escape preprocessing operation comprises:

marking a current position of the self-moving device,
wherein the marking a current position of the self-moving device comprises:
  marking the current position of the self-moving device as an obstacle;
  marking information on the obstacle on a map constructed by the self-moving device; and
  controlling the self-moving device to no longer pass the marked position in subsequent operations.

14. A moving method for a self-moving device, comprising steps of:
  driving the self-moving device to move in a first advancing direction;
  determining whether the self-moving device can continue to move in the first advancing direction; and
  controlling the self-moving device to perform a first escape preprocessing operation, when the self-moving device cannot continue to move in the first advancing direction, the first escape preprocessing operation comprising:
  controlling the self-moving device to move back and then increasing a rotation speed of a motor of a driving wheel of the self-moving device to move forward;
  controlling the self-moving device to move back and then increasing the rotation speed of the motor of the driving wheel of the self-moving device to move in a second advancing direction, when the self-moving device still cannot continue to move in the first advancing direction, wherein the second advancing direction is a direction deviated from the first advancing direction towards a first side direction by a first preset angle, wherein the first preset angle ranges from 3° to 45°;
  determining whether the self-moving device can continue to move in the second advancing direction;
  controlling the self-moving device to perform a second escape preprocessing operation, when the self-moving device cannot continue to move in the second advancing direction;
  wherein the second escape preprocessing operation comprises:
  controlling the self-moving device to move back and then increasing the rotation speed of the motor of the driving wheel of the self-moving device to move in a third advancing direction, wherein the third advancing direction is a direction deviated from the first advancing direction towards a second side direction by the first preset angle, wherein the first side direction and second side direction are opposite directions.

15. The moving method for the self-moving device according to claim 14, wherein the second escape preprocessing operation further comprises at least one of the following operations:
  controlling the self-moving device to move back;
  increasing the rotation speed of the motor of the self-moving device;
  recording a current position of the self-moving device;
  controlling the self-moving device to bypass the recorded current position of the self-moving device according to a preset motion type;
  controlling the self-moving device to send an alarm prompt; and
  increasing a reverse-rotation speed of a driving wheel of the self-moving device.

16. The moving method for the self-moving device according to claim 14, wherein the first escape preprocessing operation further comprises at least one of the following operations:
  marking a current position of the self-moving device;
  controlling the self-moving device to send alarm information; and
  increasing a reverse-rotation speed of a driving wheel of the self-moving device.

17. The moving method for the self-moving device according to claim 16, wherein the first escape preprocessing operation further comprises:
  marking a current position of the self-moving device, wherein the marking a current position of the self-moving device comprises:
  marking the current position of the self-moving device as an obstacle;
  marking information on the obstacle on a map constructed by the self-moving device; and
  controlling the self-moving device to no longer pass the marked position in subsequent operations.

18. The moving method for the self-moving device according to claim 14, wherein the self-moving device is one of a cleaning robot, a service robot, a business robot and a transfer robot.

19. The moving method for the self-moving device according to claim 14, wherein:
  determining whether the self-moving device can move back before controlling the self-moving device to move back;
  controlling the self-moving device to move back, when the self-moving device can move back successfully;
  controlling the self-moving device to perform a third escape preprocessing operation, when the self-moving device cannot move back successfully.

20. A self-moving device, comprising a traveling mechanism configured to drive the self-moving device to move on a working surface; a controller configured to generate a plurality of control instructions; and an executor configured to process the plurality of control instructions, wherein the control instructions are configured to be loaded and executed by the executor to perform the moving method for the self-moving device according to claim 14.

* * * * *